US012759950B2

(12) United States Patent
Kalyanaraman et al.

(10) Patent No.: US 12,759,950 B2
(45) Date of Patent: Oct. 13, 2026

(54) SEMI-CRYSTALLINE POLYMER-CERAMIC CORE-SHELL PARTICLE POWDERS, AND PROCESSES FOR MAKING AND ARTICLES COMPRISING SUCH POWDERS

(71) Applicant: SHPP Global Technologies B.V., Bergen op Zoom (NL)

(72) Inventors: Viswanathan Kalyanaraman, Newburgh, IN (US); Devendra Narayandas Bajaj, Evansville, IN (US); Thomas Lane Evans, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 1238 days.

(21) Appl. No.: 17/754,169

(22) PCT Filed: Sep. 25, 2020

(86) PCT No.: PCT/IB2020/058975
§ 371 (c)(1),
(2) Date: Mar. 25, 2022

(87) PCT Pub. No.: WO2021/059218
PCT Pub. Date: Apr. 1, 2021

(65) Prior Publication Data

US 2022/0289638 A1 Sep. 15, 2022

Related U.S. Application Data

(60) Provisional application No. 62/907,198, filed on Sep. 27, 2019.

(30) Foreign Application Priority Data

Feb. 14, 2020 (EP) .................................... 20157482

(51) Int. Cl.
*C04B 41/87* (2006.01)
*C04B 35/119* (2006.01)
(Continued)

(52) U.S. Cl.
CPC ............ *C04B 41/87* (2013.01); *C04B 35/119* (2013.01); *C04B 35/62813* (2013.01);
(Continued)

(58) Field of Classification Search
CPC ... C04B 41/82–84; C04B 41/48; C04B 41/50; C04B 41/87
See application file for complete search history.

(56) References Cited

U.S. PATENT DOCUMENTS 3,257,357 A 6/1966 Stamatoff
3,257,358 A 6/1966 Stamatoff
(Continued)

FOREIGN PATENT DOCUMENTS

CA 2304361 4/1999
CN 1564721 1/2005
(Continued)

OTHER PUBLICATIONS

Arburg GmbH + Co KG, "Powder injection moulding: Cost-effective solutions for metal or ceramic parts", 2016, 12 pages.
(Continued)

*Primary Examiner* — Matthew E. Hoban
(74) *Attorney, Agent, or Firm* — Norton Rose Fulbright US LLP

(57) ABSTRACT

Semi-crystalline polymer-ceramic composites and methods. The ceramic-polymer composites, in powder and/or pellet forms, comprise a plurality of core-shell particles, where: each of the core-shell particles comprises a core and a shell around the core; the core comprises a ceramic that is selected
(Continued)

from the group of ceramics consisting of: $Al_2O_3$, $ZrO_2$, and combinations of $Al_2O_3$ and $ZrO_2$; and the shell comprises a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide). The core-shell particles can be in a powder form (e.g., a dry powder). In pellet form, shells of adjacent core-shell particles are joined to resist separation of the adjacent core-shell particles and deformation of a respective pellet. Methods of forming a ceramic-polymer composite comprise: superheating a mixture of the semi-crystalline polymer (PPS, PAEK, PBT, PP, PE, SC PI, and SC Polyamide), solvent, and the ceramic ($Al_2O_3$ and/or $ZrO_2$), to dissolve the semi-crystalline polymer in the solvent; agitating the superheated mixture while substantially maintaining the mixture at an elevated temperature and pressure; and cooling the mixture to cause the semi-crystalline polymer to precipitate on the particles of the ceramic and thereby form a plurality of the present semi-crystalline polymer-ceramic core-shell particles. Methods of molding a part comprise subjecting a powder of the present semi-crystalline polymer-ceramic core-shell particles that substantially fills a mold to a first pressure while the powder is at or above a first temperature above a melting temperature ($T_m$) of the semi-crystalline polymers.

6 Claims, 8 Drawing Sheets

(51) Int. Cl.

| | |
|---|---|
| ***C04B 35/628*** | (2006.01) |
| ***C04B 35/634*** | (2006.01) |
| ***C04B 41/48*** | (2006.01) |
| ***C04B 41/50*** | (2006.01) |
| ***C04B 41/83*** | (2006.01) |

(52) U.S. Cl.

CPC .. *C04B 35/62823* (2013.01); *C04B 35/63488* (2013.01); *C04B 41/4849* (2013.01); *C04B 41/5031* (2013.01); *C04B 41/5042* (2013.01); *C04B 41/83* (2013.01); *C04B 2235/781* (2013.01); *C04B 2235/785* (2013.01); *C04B 2235/787* (2013.01)

(56) References Cited

U.S. PATENT DOCUMENTS

| | | | |
|---|---|---|---|
| 3,306,874 | A | 2/1967 | Hay |
| 3,306,875 | A | 2/1967 | Hay |
| 3,914,266 | A | 10/1975 | Hay |
| 4,028,341 | A | 6/1977 | Hay |
| 4,065,519 | A | 12/1977 | Koch |
| 4,769,424 | A | 9/1988 | Takekoshi et al. |
| 4,806,297 | A | 2/1989 | Brown et al. |
| 4,806,602 | A | 2/1989 | White et al. |
| 4,935,472 | A | 6/1990 | Brown et al. |
| 5,089,566 | A | 2/1992 | Brown et al. |
| 5,110,855 | A | 5/1992 | Blatz |
| 5,739,193 | A | 4/1998 | Walpita et al. |
| 6,518,323 | B1 | 2/2003 | Scheying et al. |
| 7,595,367 | B2 | 9/2009 | Carillo et al. |
| 9,691,520 | B2 | 6/2017 | Kim et al. |
| 2002/0038582 | A1 | 4/2002 | Holl |
| 2002/0040085 | A1 | 4/2002 | Venigalla |
| 2003/0092557 | A1 | 5/2003 | Aichele et al. |
| 2005/0167136 | A1 | 8/2005 | Chentofante |
| 2008/0275162 | A1 | 11/2008 | Schwab et al. |
| 2010/0010141 | A1 | 1/2010 | Nakamura |
| 2011/0104435 | A1 | 5/2011 | Wang |
| 2013/0011660 | A1* | 1/2013 | Diekmann .............. B22F 10/28 428/407 |
| 2013/0171416 | A1* | 7/2013 | Diekmann ............... C08K 9/08 428/407 |
| 2014/0126113 | A1 | 5/2014 | Ogiwara |
| 2014/0126130 | A1 | 5/2014 | Aurongzeb |
| 2015/0073101 | A1 | 3/2015 | Kim et al. |
| 2015/0283791 | A1 | 10/2015 | Yamashita et al. |
| 2016/0255929 | A1 | 9/2016 | Nazzaro et al. |
| 2017/0088471 | A1 | 3/2017 | Randall et al. |
| 2017/0120566 | A1 | 5/2017 | Aldousari et al. |
| 2018/0202076 | A1 | 7/2018 | Van Der Schaaf et al. |
| 2018/0346714 | A1 | 12/2018 | Bushelman et al. |
| 2019/0062219 | A1 | 2/2019 | Ketcham et al. |
| 2019/0168420 | A1 | 6/2019 | Reese et al. |
| 2019/0185382 | A1 | 6/2019 | Bolvari et al. |
| 2019/0352804 | A1 | 11/2019 | Kopping et al. |
| 2020/0347200 | A1 | 11/2020 | Dehn et al. |
| 2022/0289638 | A1 | 9/2022 | Kalyanaraman et al. |
| 2022/0289982 | A1 | 9/2022 | Kalyanaraman et al. |

FOREIGN PATENT DOCUMENTS

| | | |
|---|---|---|
| CN | 101054300 | 10/2007 |
| CN | 101328024 | 12/2008 |
| CN | 102325645 | 1/2012 |
| CN | 102548933 | 7/2012 |
| CN | 102863224 | 1/2013 |
| CN | 102275983 | 4/2013 |
| CN | 202956507 | 5/2013 |
| CN | 202977722 | 6/2013 |
| CN | 103755848 | 4/2014 |
| CN | 103764393 | 7/2014 |
| CN | 104057091 | 9/2014 |
| CN | 104057092 | 9/2014 |
| CN | 105381765 | 3/2016 |
| CN | 105482010 | 4/2016 |
| CN | 105940044 A | 9/2016 |
| CN | 106749790 | 5/2017 |
| CN | 107266082 | 10/2017 |
| CN | 107286596 | 10/2017 |
| CN | 107673658 | 2/2018 |
| CN | 108407164 | 8/2018 |
| CN | 109890876 | 6/2019 |
| CN | 105940044 B | 7/2019 |
| CN | 110140244 | 8/2019 |
| CN | 110268006 | 9/2019 |
| EP | 868732 | 10/1998 |
| EP | 2157121 | 2/2010 |
| EP | 3549763 | 10/2019 |
| EP | 3555350 | 10/2019 |
| JP | H01125338 | 5/1989 |
| JP | H 03236930 A | 10/1991 |
| JP | H 03236931 A | 10/1991 |
| JP | 11345518 | 12/1999 |
| JP | 2010/028179 | 2/2010 |
| KR | 20100098248 | 9/2010 |
| KR | 101796281 | 11/2017 |
| KR | 20180127148 A | 11/2018 |
| WO | WO 1997/042639 | 11/1997 |
| WO | WO 2014/015674 | 1/2014 |
| WO | WO 2015/167069 | 11/2015 |
| WO | WO 2017/012119 | 1/2017 |
| WO | WO 2017/039634 | 3/2017 |
| WO | WO 2017/088471 | 6/2017 |
| WO | WO 2017/149086 | 9/2017 |
| WO | WO 2018/039619 | 3/2018 |
| WO | WO 2018/039620 | 3/2018 |
| WO | WO 2018/039628 | 3/2018 |
| WO | WO 2018/039634 | 3/2018 |
| WO | WO 2018/112390 | 6/2018 |
| WO | WO 2018/140451 | 8/2018 |
| WO | WO 2018/192170 | 10/2018 |
| WO | WO 2019/025472 | 2/2019 |
| WO | WO 2019/027420 | 2/2019 |

(56) References Cited

FOREIGN PATENT DOCUMENTS

| | | |
|---|---|---|
| WO | WO 2019/183192 | 9/2019 |
| WO | WO 2019/193578 | 10/2019 |
| WO | WO 2021/059218 | 5/2021 |

OTHER PUBLICATIONS

Benhadjala W. et al., "Effect of processing factors on dielectric properties of BaTiO3/hyperbranched polyester core-shell nanoparticles," 2013 IEEE 63rd Electronic Components and Technology Conference, 2013, pp. 1767-1772, doi: 10.1109/ECTC.2013.6575814.

Brandt, K. et al. "Novel ceramic-polymer composites synthesized by compaction of polymer-encapsulated TiO2-nanoparticles", Composites Science and Technology, 72, pp. 65-71, 2011.

Chiang, C. et al., "Polymer Composites with High Dielectric Constant", Ferroelectrics, vol. 275, pp. 1-9, Dec. 24, 2001.

Edwards, J. "Apple Watch and the story of ceramics", iMore, Apr. 14, 2017. https://www.imore.com/new-star-constellation-ceramic-watches.

European Search Report and Written Opinion for Application No. 20157482.9, dated Sep. 28, 2020.

Guo, H. et al., Cold sintering process for 8 mol% Y2O3-stabilized ZrO2 ceramics, Journal of the European Ceramic Society, 37(5), 2303-2308, 2017.

Handge et al., "Viscoelastic and dielectric properties of composites of poly(vinyl butyral) and alumina particles with a high filling degree," Polymer 82 (2016) 337-348.

He, G. et al., "Research Progress on Polymer-based Dielectric Composites", Materials Review, 23, 2011, pp. 85-91.

Hutchinson, J.W. et al., "Mechanisms of toughening in ceramics", Theoretical and Applied Mechanics, 139-144, 1989.

International Search Report and Written Opinion in Corresponding PCT Application No. PCT/IB2020/058975, mailed Apr. 30, 2021.

Liu, J. et al., "Learn Iron and Forestry Engineering", *Engineering Materials, University of Technology Press*, pp. 280-282, Nov. 2016.

Luo, Y. et al., "PTC Characteristics and Microstructures of a Polymer Based Conductive Composite Filled with Various Titanium Compounds" China Plastics, 5, 2004.

Parhizkar, M. et al. "Correlation between sintering pressure and electrical properties of hot-press sintered gallium arsenide-polyaniline-polyethylene composite varistors", Materials Science in Semiconductor Processing, 17 pp. 143-148, 2014.

Peng, H. et al., The dimensional effect of MgTiO3 ceramic filler on the microwave dielectric properties of PTFE/MgTiO3 composite with ultra-low dielectric loss. J Mater Sci: Mater Electron 30, 6680-6687 (2019). https://doi.org/10.1007/s10854-019-00977-y.

Stinson, L., "Here's What You Need to Know About Ceramic, The Fancy Material in Apple's Fanciest Watch", Wired, Sep. 8, 2016. https://www.wired.com/2016/09/apples-new-high-end-watch-crazy-tough-ceramics-baby/.

Stunda-Zujeva, A. et al. "Controlling the morphology of ceramic and composite powders obtained via spray drying—A review", Ceramics International, 43 pp. 11543- 11551, 2017.

Tai, J. et al., "Synthesis of Ceramic Precursor Polyvinylsilazane-b-Polystyrene and Preparation of Ceramic Nanoparticles", Journal of Synthetic Crystals, 5, 2011. pp. 1266-1270.

Wolff, M. et al. "Novel, highly-filled ceramic-polymer composites synthesized by a spouted bed spray granulation process", Composites Science and Technology, 90, pp. 154-159, 2014.

* cited by examiner

SEMI-CRYSTALLINE POLYMER-CERAMIC CORE-SHELL PARTICLE POWDERS, AND PROCESSES FOR MAKING AND ARTICLES COMPRISING SUCH POWDERS

CROSS-REFERENCE TO RELATED APPLICATIONS

This application is a national phase application under 35 U.S.C. § 371 of International Application No. PCT/IB2020/058975 filed Sep. 25, 2020, which claims the benefit of priority of European Patent Application No. 20157482.9 filed Feb. 14, 2020, which claims the benefit of priority of U.S. Provisional Patent Application No. 62/907,198 filed 27 Sep. 2019, all of which are hereby incorporated by reference in their entirety.

FIELD OF INVENTION

This disclosure relates generally to ceramic-thermoplastic composites and more particularly, but not by way of limitation, to semi-crystalline polymer-ceramic core-shell particle powders and related processes and articles.

BACKGROUND

There are currently a limited number of ceramic-polymer composites with a high proportion of ceramic. Known ceramic-polymer composites typically contain significantly less than 50% by volume of ceramic, and significantly more than 50% by volume of polymer.

A first category of such ceramic-polymer composites relies on a thermoset approach in which a monomer is combined with the porous ceramic structure and cured to form a composite. But this approach generally requires undesirably-long curing times, and density of a final part is generally dependent on the size of pores in the ceramic and the viscosity of the resin.

A second category of such ceramic-polymer composites relies on thermoplastic polymers, which generally do not require time to cure and can instead be simply heated to melt and subsequently cooled to solidity the thermoplastic polymer, thereby enabling relatively faster processing. Ceramic fillers have been compounded with thermoplastics to achieve certain properties, including stiffness and strength. However, the ceramic filler content in such thermoplastic polymers is typically limited to significantly less than 50% by volume due to limitations of conventional compounding technology. For example, in a traditional approach of this type, a ceramic filler is added to a polymer and the mixture is compounded in an extruder and palletized. Generally, the dispersion and distribution of the ceramic filler in the polymer matrix is highly dependent on the type of ceramic and polymer, other additives and coupling agents, rate of mixing, shear rate, temperature, and various other parameters. Due at least to these limitations, higher proportions of ceramics fillers e.g., greater than 50% by volume) in a polymer matrix is challenging, and may for example damage the screws in an extruder (depending on the hardness of the ceramic) and degrade the polymer because of shear and heat.

A third category of such ceramic-polymer composites relies on the more-recently identified approach known as "cold sintering," various aspects of which may be described in U.S. Patent App. Pub. No. US 2017/0088471 and PCT Application Pub. Nos. (1) WO 2018/039620, (2) No. WO 2018/039628, (3) WO 2018/039619, and (4) WO 2018/039634. One drawback with cold sintering, however, is that not all ceramics can be effectively cold sintered. For example, certain structural ceramics like Aluminum Oxide, Zirconia, Titanium Oxide, and Silicon Carbide generally cannot be cold sintered. Additionally, the structures produced by cold sintering typically utilize ceramic as the matrix and polymer as the filler, which generally results in differing structural properties and differing suitability for various end-use applications.

A fourth category of such ceramic-polymer composites can involve dissolving an amorphous polymer in a solvent, and mixing ceramic particles into the polymer-solvent mixture. For example, a sprouted-bed granulation process can be used to create polymer-coated ceramic powders, such as described in Wolff, Composites Science and Technology 90 (2014) 154-159.

SUMMARY

This disclosure includes core-shell particles, powders and pellets of such core-shell particles, methods of making such core-shell particles in powder and pellet forms, and methods of molding a part from a powder of such core-shell particles. Such core-shell particles comprise a core and a shell around the core, in which the core comprises a ceramic selected from the group of ceramics consisting of: Alumina ($Al_2O_3$), Zirconia ($ZrO_2$), and combinations of $Al_2O_3$ and $ZrO_2$; and the shell comprises a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide). Such core-shell particles, and powders and pellets thereof, permit the molding of ceramic-composite molded parts with high ceramic content by conventional processes such as compression molding and injection molding.

The present methods of making semi-crystalline polymer-ceramic core-shell particles permit the formation of such core-shell particles with relatively uniform coatings of the polymer shell material. More particularly, in the present core-shell particles (formed by the present methods), the shell can surround substantially all of the surface of the core, at least in configurations in which the polymer comprises at least 10% by volume of the core-shell particles. Likewise, the present core-shell particles (formed by the present methods) facilitate the molding of ceramic-polymer composite parts with significantly less agglomeration of ceramic particles than prior compounding methods in which parts are molded from a mixture of separate ceramic particles and polymer particles. By way of example, and not to be limited by a particular theory, it is currently believed that the substantially uniform polymer coating formed on the ceramic core causes the polymer to resist separation from the ceramic during processing and molding, and thereby resist contact between (and agglomeration of) the ceramic cores. Further, the present methods of making semi-crystalline polymer-ceramic core-shell particles permit the formation of relatively fine, relatively consistent powders without the need for grinding or sieving. The present methods can also result in core-shell particles with less variation in size relative to the starting polymer powder which, in turn, leads to more uniform distribution of ceramic and polymer in molded part than has been possible with traditional compounding methods in which parts are molded from a mixture of separate ceramic particles and polymer particles. For example, as described in more detail below in Table 1B, the Dv90 of the PPS-$Al_2O_3$ was about 32% of the Dv90 of the raw PPS powder used in the described examples.

Ultimately, the present methods permit the formation of powders of semi-crystalline polymer-ceramic core-shell particles with relatively large fractions of ceramic (e.g., greater than 50% by volume, between 50% and 90% by volume, between 50% and 70% by volume, and/or the like). By way of further example, for ceramic:polymer ratios between 55:45 and 65:45 by volume, he ceramic particles can have a surface area of from 2 to 4 $m^2/g$ (e.g., from 2 to 2.5 $m^2/g$, 2 to 3 $m^2/g$, 2 to 3.5 $m^2/g$, 2.5 to 3 $m^2/g$, 2.5 to 3.5 $m^2/g$, 2.5 to 4 $m^2/g$, 3 to 3.5 $m^2/g$, 3 to 4 $m^2/g$, or 3.5 to 4 $m^2/g$); for ceramic:polymer ratios between 50:50 and 60:40 by volume, the ceramic particles can have a surface area of from 3 to 6 $m^2/g$ (e.g., from 3 to 3.5 $m^2/g$, 3 to 4 $m^2/g$, 3 to 4.5 $m^2/g$, 3 to 4 $m^2/g$, 3 to 5 $m^2/g$, 3 to 4 $m^2/g$, 3 to 5.5 $m^2/g$, 3.5 to 4 $m^2/g$, 3.5 to 4.5 $m^2/g$, 3.5 to 5 $m^2/g$, 3.5 to 5.5 $m^2/g$, 4 to 4.5 $m^2/g$, 4 to 5 $m^2/g$, 4 to 5.5 $m^2/g$, 4.5 to 5 $m^2/g$, 4.5 to 5.5 $m^2/g$, or 5 to 5.5 $m^2/g$); for ceramic:polymer ratios between 60:40 and 70:30 by volume, the ceramic particles can have a surface area of from 1 to 3 $m^2/g$ (e.g., from 1 to 1.5 $m^2/g$, 1 to 2 $m^2/g$, 1 to 2.5 $m^2/g$, 1.5 to 2 $m^2/g$, 1.5 to 2.5 $m^2/g$, 1.5 to 3 $m^2/g$, 2 to 2.5 $m^2/g$, 2 to 3 $m^2/g$, or 2.5 to 3 $m^2/g$); and for ceramic:polymer ratios between 70:30 and 90:10 by volume, the ceramic particles can have a surface area of from 0.5 to 2 $m^2/g$ (e.g., from 0.5 to 1 $m^2/g$, 0.5 to 1.5 $m^2/g$, 0.5 to 2 $m^2/g$, 1 to 1.5 $m^2/g$, 1 to 2 $m^2/g$, or 1.5 to 2 $m^2/g$).

By way of example, such semi-crystalline polymer-ceramic core-shell particles with higher proportions of structural ceramic (e.g., $Al_2O_3$) can be beneficial in structural components like gears, CE housings, protective shields, and the like because these types of applications typically benefit from properties such as wear resistance, hardness, scratch resistance, toughness, and stiffness. Additionally, the inclusion of ceramic particles in a polymer matrix can permit the adjustment and/or selection of properties like dielectric constant, dissipation factor, and RF transparency that can be beneficial for certain electronics applications.

Certain configurations of the present ceramic-polymer composite powders comprise: a plurality of core-shell particles, where: each of the core-shell particles comprises a core and a shell around the core; the core comprises a particle of a ceramic that is selected from the group of ceramics consisting of: $Al_2O_3$, $ZrO_2$, and combinations of $Al_2O_3$ and $ZrO_2$; and the shell comprises a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide); where the core-shell particles are in powder form. The core-shell particles can comprise between 50% and 90% by volume of ceramic, and between 10% and 50% by volume of the semi-crystalline polymer; and/or can have a Dv50 of from 50 nanometers (nm) to 100 micrometers (μm). Typically, substantially all of the semi-crystalline polymer is not cross-linked.

Certain configurations of the present dense polymer-ceramic composite articles comprise: a polymer matrix and ceramic filler dispersed in the polymer matrix; where the ceramic filler comprises particles of a ceramic that is selected from the group of ceramics consisting of: $Al_2O_3$, $ZrO_2$, and combinations of $Al_2O_3$ and $ZrO_2$; and where the polymer matrix comprises a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide); and where the Relative Density of the article is greater than 90%. The ceramic filler can comprise between 50% and 90% by volume of the article, and the polymer matrix between 10% and 50% by volume of the article. Typically, the ceramic particles are substantially free of agglomeration.

The present ceramic-polymer composite materials can also be pelletized (converted to pellet form). Such pelletized material can comprise: a plurality of solid pellets each comprising a plurality of core-shell particles, where: each of the core-shell particles comprises a core and a shell around the core; the core comprises a particle of a ceramic selected that is selected from the group of ceramics consisting of: $Al_2O_3$, $ZrO_2$, and combinations of $Al_2O_3$ and $ZrO_2$; the shell comprises a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide); and the shells of adjacent core-shell particles are joined to resist separation of the adjacent core-shell particles and deformation of a respective pellet. In such pellets, the core-shell particles can comprise between 50% and 90% by volume of ceramic, and between 10% and 50% by volume of the semi-crystalline polymer. Typically, substantially all of the polymer is not cross-linked.

In certain implementations of the present methods of forming a ceramic-polymer composite powder, the method comprises: mixing a solvent, particles of a ceramic that is selected from the group of ceramics consisting of: $Al_2O_3$, $ZrO_2$, and combinations of $Al_2O_3$ and $ZrO_2$; and a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide), semi-crystalline polyimide (SC PI), and semi-crystalline polyamide (SC Polyamide); dissolving at least partially the semi-crystalline polymer in the solvent by superheating the mixture to a first temperature above the normal boiling point of the solvent and while maintaining the mixture at or above a first pressure at which the solvent remains substantially liquid; agitating the superheated mixture for a period of minutes while maintaining the mixture at or above the first temperature and at or above the first pressure; and cooling the mixture to or below a second temperature below the normal boiling point of the solvent to cause the semi-crystalline polymer to precipitate on the particles of the ceramic and thereby form a plurality of core-shell particles each comprising a core and a shell around the core, where the core comprises a particle of the ceramic and the shell comprises the semi-crystalline polymer.

In certain implementations of the present methods of molding a part from the present core-shell particles, the method comprises: subjecting a powder one of the present semi-crystalline polymer-ceramic core-shell particles to a first pressure while the powder is at or above a first temperature that exceeds a melting temperature ($T_m$) of the polymer; where the powder substantially fills a working portion of a cavity of a mold.

The terms "a" and "an" are defined as one or more unless this disclosure explicitly requires otherwise. The terms "substantially" and "about" are each defined as largely but not necessarily wholly what is specified (and includes what is specified; e.g., substantially 90 degrees includes 90 degrees), as understood by a person of ordinary skill in the art. In any disclosed embodiment, the term "substantially" or "about" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. The phrase "at least one of A and B" has the same meaning as "A, B, or A and B."

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

As used herein, a "size" or "diameter" of a particle refers to its equivalent diameter—referred to herein as its diameter—if the particle is modelled as a sphere. A sphere that models a particle can be, for example, a sphere that would have or produce a value measured for the particle, such as the particle's mass and/or volume, light scattered by the particle, or the like. Particles of the present dispersions can, but need not, be spherical.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1:
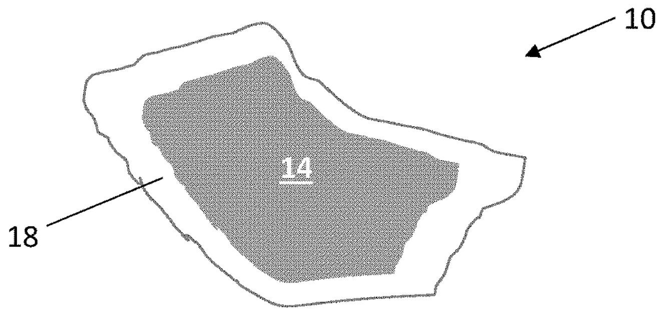
FIG. 1 is a schematic illustration of one of the present core-shell particles comprising a semi-crystalline polymer shell and a core of $Al_2O_3$.

Referring now to the drawings, and more particularly to FIG. 1, a schematic illustration is shown of one of the present core-shell particles 10 comprising a core 14 and a shell 18 around the core. In the illustrated configurations, for example, core 14 comprises a single particle of a ceramic that is selected from the group of ceramics consisting of: $Al_2O_3$, $ZrO_2$, and combinations of $Al_2O_3$ and $ZrO_2$; and may have a spherical, elongated (e.g., cylindrical), irregular, or otherwise fanciful shape as shown. In other configurations, the core may comprise an agglomeration of two or more particles, and/or may have a substantially spherical shape. Shell 18 comprises a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide). In the illustrated configuration, shell 18 covers or surrounds substantially all of core 14. In other configurations, the shell need not cover or surround all of the core (e.g., may cover a majority of the core). As described in more detail below, the present methods permit the formation of a PPS shell (e.g., 18) that is not cross-linked, and is semi-crystalline.

In the present core-shell particles, the core (e.g., 14) can have a particle size (e.g., diameter or minimum transverse dimension) of from 50 nanometers (nm) to 100 micrometers (μm). For example, the cores in a ceramic powder used to form core-shell particles in the present methods can have a Dv90 or Dv50 of between 50 nm and 100 μm.

The present powders comprise a plurality of particles 10, for example in a powder form. For example, a powder may be characterized by a polymer-solvent content (a solvent in which the polymer is dissolvable) of less than 3,000 parts per million (ppm) (e.g., less than 2,000 ppm, less than 1,000 ppm). However, in some configurations, the powder may mixed with and/or suspended in a liquid that is not a polymer-solvent (a liquid in which the polymer will not dissolve), such as water. In such configurations, the liquid may resist and/or prevent particles from becoming airborne or breathable, such as for transportation and handling of finer powders.

In some configurations of the present powders, the core-shell particles comprise between 40% and 90% by volume of the ceramic (e.g., 50% and 70% by volume of the ceramic).

Figure 2:
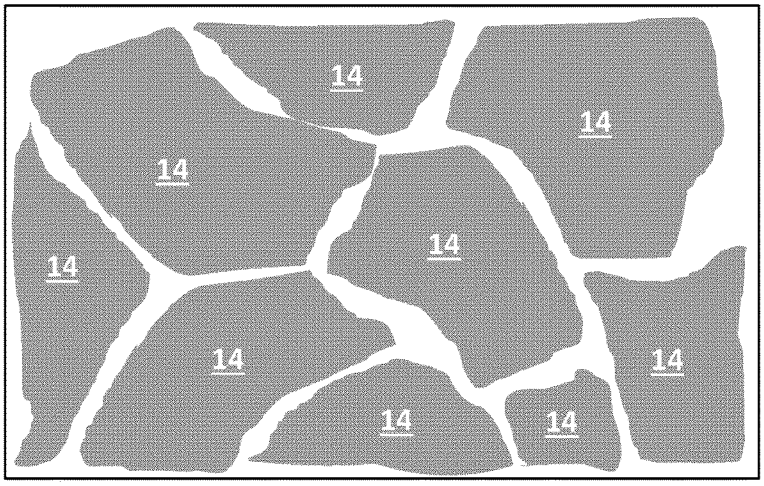
FIG. 2 is a schematic illustration of the internal structure of a part molded from a powder of the present core-shell particles.

FIG. 2 is a schematic illustration of the internal structure of a part molded from a dry powder of the present core-shell particles 10. As shown, the semi-crystalline polymer shells 18 of adjacent particles merge together to fill interstices between and bond the particles together. As shown, the relatively higher proportion (e.g., 40% to 90% by volume) of ceramic in the powder means that a correspondingly higher proportion of the molded part is also ceramic. Further, the core-shell structure of the particles prior to molding results in more-uniform distribution of semi-crystalline polymer within the matrix of the molded part. By way of example, the present core-shell particles, in which the ceramic particles are substantially free of agglomeration and/or substantially all of the ceramic particles are each substantially surrounded by polymer, enable the molding of parts that are also substantially free of agglomeration and/or in which substantially all of the ceramic particles is separated by a layer of polymer from adjacent ceramic polymer particles.

The present powders can also be pelletized or joined into a pellet form in which the shells of adjacent core-shell particles are joined to resist separation of the adjacent core-shell particles and deformation of a respective pellet. For example, the present powders may be subjected to elevated temperatures and pressures in an extruder. Such temperatures may be at or near the glass transition temperature ($T_g$) of the semi-crystalline polymer in the core-shell particles to render the semi-crystalline polymer tacky but not liquefied, and such pressures (e.g., during extrusion) may be elevated relative to ambient, such that shells of adjacent core-shell particles join sufficiently to resist separation but no so much that the independent boundaries/identities of adjacent shells are lost. In such configurations, the pellet form may facilitate transportation of the core-shell particles (e.g., for distribution). Such pelletization can be achieved by any of various methods and processes that are known in the art, such as, for example, via a screw extruder.

Polyphenylene Sulfide (PPS) Resins

Generally, polyphenylene sulfide (PPS) is known in the art as a high-performance thermoplastic. PPS can be molded, extruded, or machined to tight tolerances, and has a relatively high maximum service temperatures of about 218° C. Structurally, PPS is an organic polymer consisting of aromatic rings linked by sulfides, as illustrated by Formula (1):

(1)

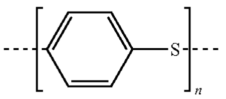

In particular, the PPS used in the below-described examples was a grade FORTRON* 0214 course PPS powder available from Celanese Corporation (*Trademark of Celanese Corporation). Generally, the present methods and core-shell particles utilize PPS with a molecular weight (Mw) in excess of 10,000.

Poly(arylene sulfide)s are known polymers containing arylene groups separated by sulfur atoms. They include poly(phenylene sulfide)s, for example poly(phenylene sulfide) and substituted poly(phenylene sulfide)s, all of which may generally be referred to as polyphenylene sulfide or PPS. Generally, poly(arylene sulfide) has repeating units of Formula (2):

(2)

$$—[(Ar^1)_n—X]_m—[(Ar^2)_i—Y]_j—[(Ar^3)_k—Z]_l—[(Ar^4)_o—W]_p$$

wherein $Ar^1$, $Ar^2$, $Ar^3$, and $Ar^4$ are independently arylene units of 6 to 18 carbons, W, X, Y, and Z are independently bivalent linking groups selected from $—SO_2—$, —S—, —SO—, —CO—, —O—, —C(O)O—, alkylene group having 1 to 6 carbons, or alkylidene group having 1 to 6 carbons, wherein at least one of the linking groups is —S—; and n, m, i, j, k, l, o, and p are independently 0, 1, 2, 3, or 4 with the proviso that their sum total is not less than 2.

The arylene units $Ar^1$, $Ar^e$, $Ar^a$, and $Ar^4$ may be selectively substituted or unsubstituted. Exemplary arylene units are phenylene, biphenylene, naphthylene, anthracene and phenanthrene. The poly(arylene sulfide) typically includes more than 30 mol %, more than 50 mol %, or more than 70 mol % arylene sulfide (—S—) units. For example, the poly(arylene sulfide) may include at least 85 mol % sulfide linkages attached directly to two aromatic rings. In one particular embodiment, the poly(arylene sulfide) is a poly (phenylene sulfide), defined herein as containing the phenylene sulfide structure $—(C_6H_4—S)_n—$ (wherein n is an integer of 1 or more) as a component thereof. Examples of PPS resin are described in ASTM D6358-11.

Synthesis techniques that may be used in making a poly(arylene sulfide) are generally known in the art. By way of example, a process for producing a poly(arylene sulfide) can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalodiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'- dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the poly(arylene sulfide) or to regulate the polymerization reaction and/or the molecular weight of the poly(arylene sulfide).

The poly(arylene sulfide) may be a homopolymer or a copolymer. For instance, selective combination of dihaloaromatic compounds can result in a poly(arylene sulfide) copolymer containing not less than two different units. For instance, when p-dichlorobenzene is used in combination with m-dichlorobenzene or 4,4'-dichlorodiphenylsulfone, a poly(arylene sulfide) copolymer can be formed containing segments having the structure of Formula (3):

(3)

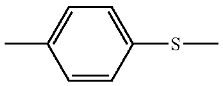

and segments having the structure of Formula (4):

(4)

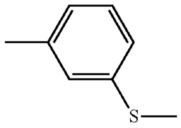

or segments having the structure of Formula (5):

(5)

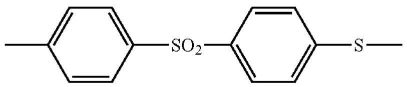

The poly(arylene sulfide) may be linear, branched or a combination of linear and branched. Linear poly(arylene sulfide)s typically contain 70 mol % or more (e.g., 80 mol %, 90 mol %, or more) of the repeating unit —(Ar—S)—. Such linear polymers may also include a small amount of a branching unit or a cross-linking unit, but the amount of branching or cross-linking units is typically less than 1 mol % of the total monomer units of the poly(arylene sulfide). A linear poly(arylene sulfide) polymer may be a random copolymer or a block copolymer containing the above-mentioned repeating unit. Semi-linear poly(arylene sulfide)s may likewise have a cross-linking structure or a branched structure introduced into the polymer a small amount of one or more monomers having three or more reactive functional groups. By way of example, monomer components used in forming a semi-linear poly(arylene sulfide) can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and W is a polyvalent aromatic radical of valence n which can have up to 4 methyl substituents, the total number of carbon atoms in W being within the range of 6 to 16. Examples of some polyhaloaromatic compounds having more than two halogens substituted per molecule that can be employed in forming a semi-linear poly(arylene sulfide) include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and combinations comprising at least one of the foregoing.

Regardless of the particular structure, the weight average molecular weight of the poly(arylene sulfide) can be greater than or equal to 10,000 grams per mole (g/mol) (e.g., greater than 15,000 g/mol, greater than 20,000 g/mol, or more). Molecular weight can be determined by gel permeation chromatography (GPC) as per ASTM D5296-11 using polystyrene standards. In some instances a high temperature GPC methods, for example as per ASTM D6474-11, may be employed using 1-chloronaphthalene at 220° C. as solvent.

In certain cases, a small amount of chlorine may be employed during formation of the poly(arylene sulfide). Nevertheless, the poly(arylene sulfide) may still have a low chlorine content, such as less than or equal to 1000 ppm, or less than or equal to 900 ppm, or less than or equal to 800 ppm, or, less than or equal to 700 ppm. Within this range the chlorine content can be greater than or equal to 1 ppm. The poly(arylene sulfide) can be free of chlorine or other halogens. In other instances the poly(arylene sulfide) will have a chlorine content of at least 100 ppm.

The poly(arylene sulfide) may be a poly(phenylene sulfide) having a crystalline melting point of 250° C. to 290° C. as determined by differential scanning calorimetry (DSC) using a 20° C./minute heating rate and the crystalline melting point (Tm) determined on the second heat as described by ASTM D3418-12.

Linear poly(arylene sulfide) is commercially available from Celanese Corporation as Fortron® PPS and from Solvay as Ryton® PPS.

The poly(arylene sulfide) may be functionalized or unfunctionalized. If the poly(arylene sulfide) is functionalized, the functional groups may include, but are not limited to, amino, carboxylic acid, metal carboxylate, disulfide, thio and metal thiolate groups. One method for incorporation of functional groups into poly(arylene sulfide) can be found in U.S. Pat. No. 4,769,424, incorporated herein by reference, which discloses incorporation of substituted thiophenols into halogen substituted poly(arylene sulfide). Another method involves incorporation of chlorosubstituted aromatic compounds containing the desired functionality reacted with an alkali metal sulfide and chloroaromatic compounds. A third method involves reaction of poly(arylene sulfide) with a disulfide containing the desired functional groups, typically in the melt or in a suitable high boiling solvent such as chloronaphthalene.

Though the melt viscosity of poly(arylene sulfide) is not particularly limited so far as the moldings which can be obtained, the melt viscosity can be greater than or equal to 100 Poise and less than or equal to 10,000 poise at a melt processing temperature of 300 to 350° C.

The poly(arylene sulfide) may also be treated to remove contaminating ions by immersing the resin in deionized water or by treatment with an acid, typically hydrochloric acid, sulfuric acid, phosphoric acid or acetic acid as found in Japanese Kokai Nos. 3236930-A, 1774562-A, 12299872-A and 3236931-A. For some product applications, it is preferred to have a very low impurity level in the poly(arylene sulfide), represented as the percent by weight ash remaining after burning a sample of the poly(arylene sulfide). The ash content of the poly(arylene sulfide) can be less than about 1% by weight, more specifically less than about 0.5% by weight, or even more specifically less than about 0.1% by weight.

Polyaryl Ether Ketone (PAEK)

PAEK is a semi-crystalline thermoplastic that is recognized in the art as having excellent mechanical and chemical resistance properties that are retained to high temperatures. The processing conditions used to mold PEEK can influence the crystallinity and hence the mechanical properties. PEEK is commercially available from Victrex Ltd. as VICTREX PEEK.

Examples of polyaryletherketones (PAEKs) that are usable in at least some of the present configurations/implementations can include polyetheretherketone (PEEK), polyetherketone (PEK), polyetherketoneketone (PEKK), polyetheretherketoneketone (PEEKK), and polyetherketoneetherketoneketone (PEKEKK). Suitable compounds from these groups are known in the art. Particular commercial examples include PEEK™ and PEK™ polymer types (available from Victrex plc.), especially PEEK™ 450P, PEEK™ 150P and PEK™ P22. In particular, the PEEK used in the below-described examples was a grade PEEK 150G.

Polybutylene Terephthalate (PBT)

Polybutylene Terephthalate (PBT) is a semi-crystalline engineering thermoplastic material that is used, for example, as an electrical insulator. Various grades of PBT are commercially available, including, for example, VALOX™ Resin and VALOX™ FR Resin available from SABIC Innovative Plastics.

Polypropylene (PP)

Polypropylene (PP) is a thermoplastic polymer used in a wide variety of applications.

The type of polypropylene used in the present applications and can be a PP homopolymer, a PP random copolymer, a heterophasic PP copolymer, or a blend of two or more of the foregoing. That said, in view of the final application of the polypropylene, the polypropylene is generally of a type that can be shaped using injection molding, blow molding or compression molding. Consequently the melt flow index will typically be in the range of from 10-250 g/10 min, such as from 10-100 g/10 min or 20-80 g/10 min or 30-60 g/10 min as determined in accordance with ISO 1 133 (2.16 kg, 230° C.).

Polyethylene (PE)

Polyethylene (PE) is widely used in numerous applications. Depending on desired properties, the present semi-crystalline polymer-ceramic core-shell particles can comprise low-density PE (LDPE) and/or high-density PE (HDPE), as are known in the art. For example, examples of suitable PE may have a density of from 0.91-0.965 g/cm$^3$ and a melt flow index of from 0.01-12 g/10 min; examples of suitable HDPE may have a density of from 0.94-0.965 g/cm$^3$, and a melt flow index of from 0.01-1 g/10 min; examples of suitable LDPE may have a density of from 0.91-0.93 g/cm$^3$ and a melt flow index of from 0.5-12 g/10 min.

Semi-Crystalline Polyimide (SC PI)

Polyimide (PI) is a polymer of imide monomers. Some types of PI are semi-crystalline. The present disclosure utilizes semi-crystalline PI (SC PI). SC PI may, for example, be based on dianhydrides (aliphatic or aromatic) and diamines (aliphatic or aromatic). Certain examples of SC CPI are known in the art as LARC-CPI. SC PI is available commercially from Mitsui Chemicals in grades of AURUM* (*Trademark of Mitsui), some of which may require annealing to exhibit crystallinity, and from RTP Company as RTP-42xx grades (e.g., RTP 4201).

Semi-Crystalline Polyamide (SC Polyamide)

Polyamide is commonly known in the art as Nylons, some of which are semi-crystalline. The present disclosure utilizes semi-crystalline polyamide. SC polyamide or nylon is available commercially, for example from RTP Company, in various grades, including PA6 or 6 (PA), PA66 or 6/6 (PA), PA11 or 11 (PA), PA12 or 12 (PA), PA610 or 6/10 (PA), PA46 or 4/6 (PA).

Figure 3:
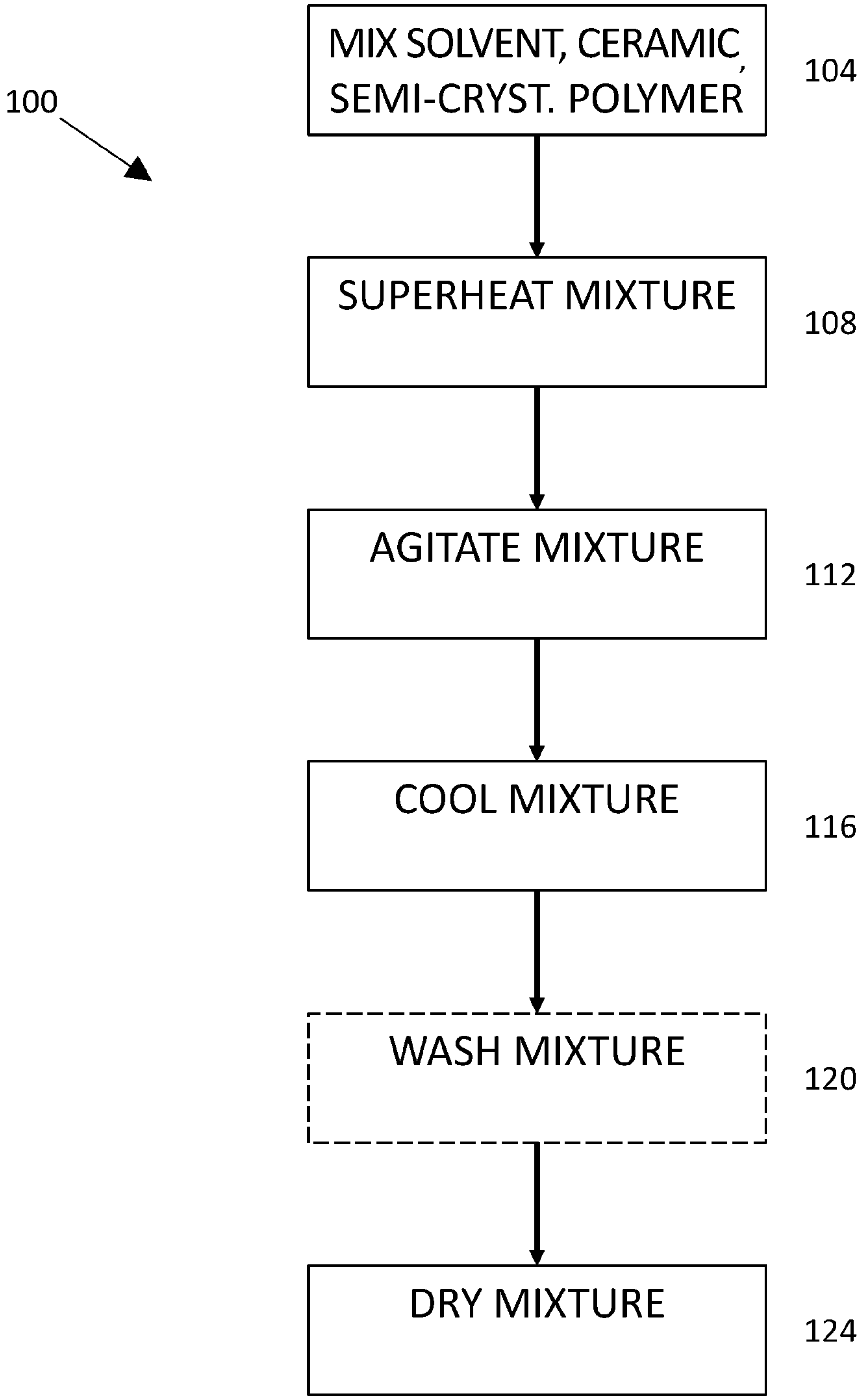
FIG. 3 is a flowchart of one example of a method of making a powder of the present core-shell particles.
Figure 4:
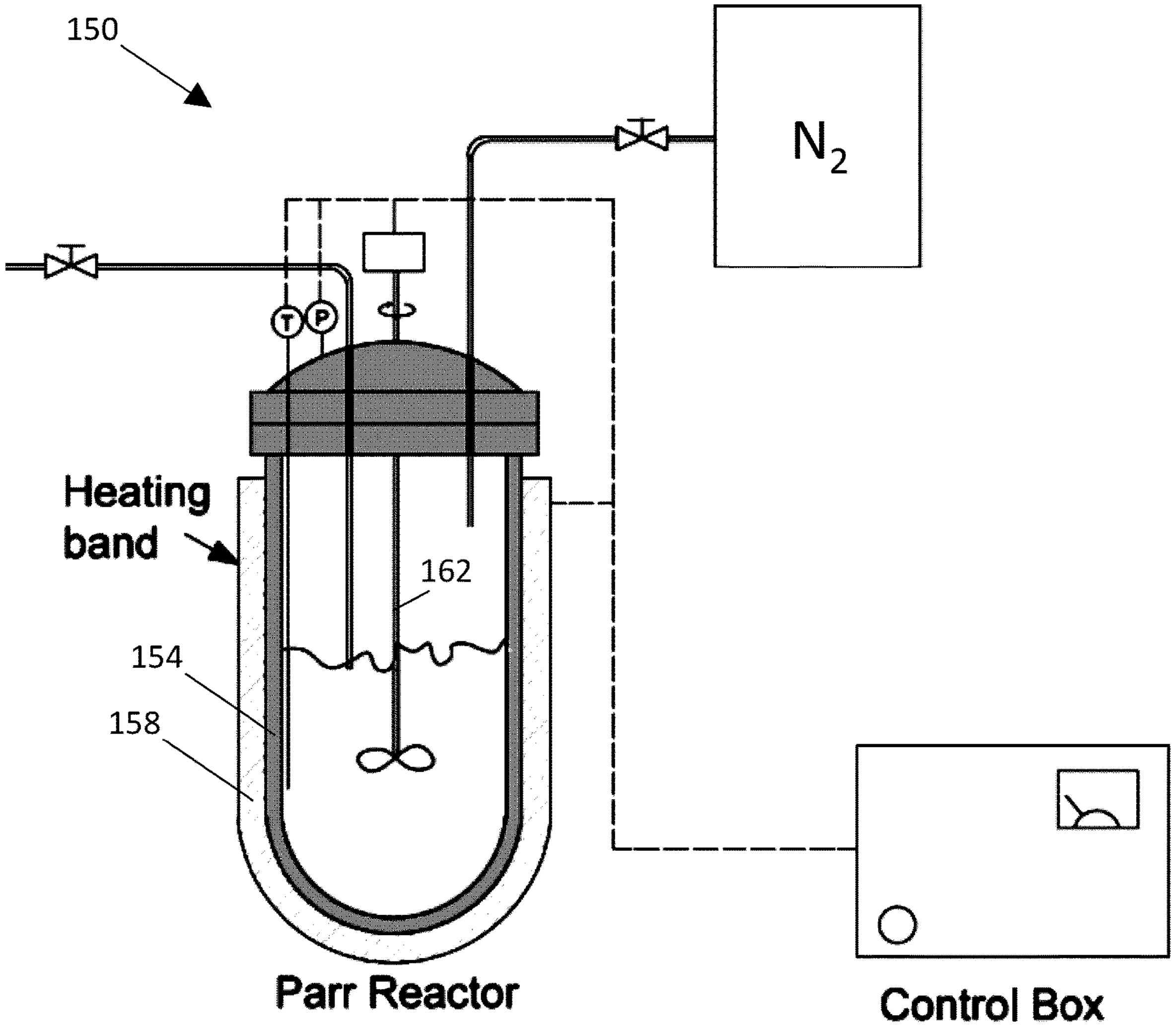
FIG. 4 is a schematic illustration of stirring reactor of a type that can be used to make a powder of the present core-shell particles.

Methods of Making Powders of Semi-Crystalline Polymer-Ceramic Core-Shell Particles Referring now to FIGS. 3 and 4, FIG. 3 depicts a flowchart 100 of one example of a method of making a powder of the present core-shell particles (e.g. 10), and FIG. 4 depicts a schematic illustration of stirring reactor 150 of a type (e.g., a PARR™ reactor) that can be used to make a powder of the present core-shell particles.

First mixing the ceramic particles with the solvent can have certain benefits, for example, in reducing the agglomerating of ceramic particles. This benefit can be realized whether beginning with ceramic particles that are not agglomerated in their powder form, or with ceramic particles that are agglomerated in their powder form. For example, the $Al_2O_3$ powder (CAS 1344-28-1) used in the below-described examples was obtained from Alfa Aesar and, in its raw form prior to usage in the present methods, comprised spherical hollow particles with an average particle size of from 20 to 50 μm and surface area of from 5 to 6 m$^2$/g. Mixing these hollow particles with solvent prior to adding polymer caused the hollow particles to break down into their smaller, solid particles components, which solid particles had an average particle size of 1 μm or smaller, while also resisting re-agglomeration of the solid particles during the subsequent mixing, dissolution, and precipitation of the polymer on the solid ceramic particles.

At a step 104, semi-crystalline polymer (PPS, PAEK, PBT, PP, PE, SC PI, and SC Polyamide), solvent, and particles of the ceramic are mixed together. The polymer, solvent, and ceramic may be mixed at the same time in a single vessel, or may be mixed sequentially. For example, the ceramic particles may first be mixed into a solvent (e.g., in a first vessel, such as a homogenizer), and the polymer may subsequently be mixed into the solvent-ceramic mixture (e.g., in the first vessel or in a second vessel, such as a shell or container 154 of stirring reactor 150). The solvent may comprise any solvent in which the polymer will dissolve under superheated conditions, as described below. The PPS examples described below utilized N-Methyl-2-pyrrolidone (NMP). The PEEK examples described below utilized NMP or orthodichlorobenzene (ODCB). Other solvents that may be utilized in the present methods include those in which the polymer is Freely Soluble or Soluble at elevated temperatures (e.g., above 75° C., above 100° C., about 150° C., and/or above 200° C.), and Slightly Soluble or Sparingly Soluble at lower temperatures (e.g., below 50° C., such as at ambient temperatures), examples of which include: sulfolane, DMSO (dimethyl sulfoxide), DMF (dimethylformamide), DMAC (Dimethylacetamide), ODCB (orthodichlorobenzene), chlorobenzene, 4-Chloro Phenol, and NEP (N-ethyl pyrrolidone). As used herein, Freely Soluble requires 1 to 10 ml of solvent to dissolve 1 gram (g) of the polymer, Soluble requires 10 to 30 ml of solvent to dissolve 1 gram (g) of the polymer; Slightly Soluble requires 100 to 1000 ml of solvent to dissolve 1 gram (g) of the polymer; Sparingly Soluble requires 1000 to 10000 ml of solvent to dissolve 1 gram (g) of the polymer.

At a step 108, the mixture of polymer, ceramic, and solvent is superheated (e.g., via a heating element 158 of reactor 150) to at least partially (e.g., fully) dissolve the polymer in the solvent. In particular, the mixture is heated to a first temperature that exceeds the normal boiling point of the solvent (and exceeds the glass transition temperature of an amorphous polymer, or the melting temperature of a semi-crystalline polymer), under a first pressure at which the solvent remains liquid. For example, when using NMP as the solvent, the mixture can be heated to 270° C. under a pressure of up to 180 pounds per square inch (psi) (e.g., 75 psi). When using other solvents, the pressure may be kept at a different level (e.g., 100 psi).

At a step 112, which may be partially or entirely simultaneous with step 108, the mixture is agitated (e.g., via impeller 162 of reactor 150) for a period of minutes (e.g., equal to or greater than 1 minute, 5 minutes, 10 minutes, 20 minutes, 30 minutes, 40 minutes, 50 minutes, 60 minutes, or more) while the temperature of the mixture is substantially maintained at or above the first temperature, and the pressure to which the mixture is subjected is substantially maintained at or above the first pressure. In particular, the temperature and pressure are maintained during agitation to keep the mixture in a superheated state.

At a step 116, the mixture is cooled to or below a second temperature that is below the normal boiling point of the solvent to cause the polymer to precipitate on the particles of the ceramic and thereby form a plurality of the present core-shell particles (e.g., 10). For example, when using NMP as the solvent, the mixture may be cooled to less than 120° C., less than 110° C., and/or to 100° C. Optionally, the mixture may continue to be agitated during this cooling step to resist agglomeration of the core-shell particles.

At an optional step 120, the formed core-shell particles may be washed or rinsed, either with the same solvent added in step 104 (e.g., NMP) or with a different solvent (e.g, Methanol or MeOH). For example, the wet solids cake can be removed from the vessel (e.g., shell or container 154 of reactor 150) and placed in a filter for rinsing.

At a step 124, the solids cake is dried to form a dry powder of the core-shell particles (e.g., 10), for example, at a temperature above the normal boiling point of the solvent added in step 104 and/or of the solvent used to wash/rinse the solids cake at optional step 120, optionally at a second pressure below ambient pressure (i.e., under vacuum). By way of example, when NMP (normal boiling point of ~202° C.) is added at step 104 and MeOH (normal boiling point of ~65° C.) is used in step 120, the solids cake can be dried under vacuum at a temperature of 200° C. for a period of time (e.g., 4 hours, 6, hours, 8 hours, 10 hours, 12 hours, or more).

Figure 5:
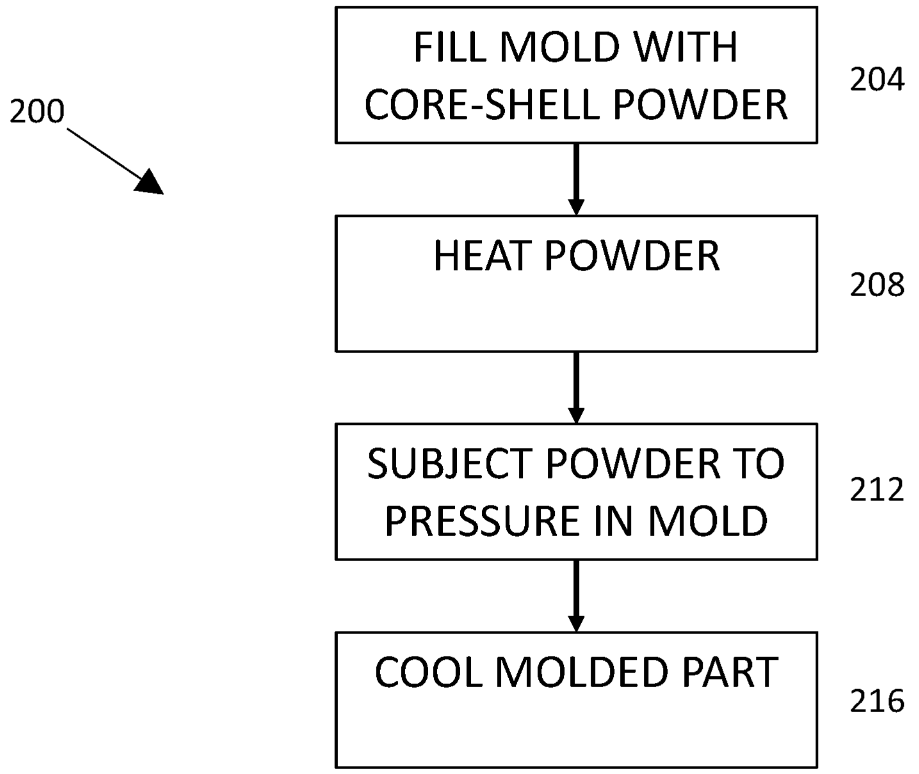
FIG. 5 is a flowchart of one example of a method of molding a part from a powder of the present core-shell particles.
Figure 6:
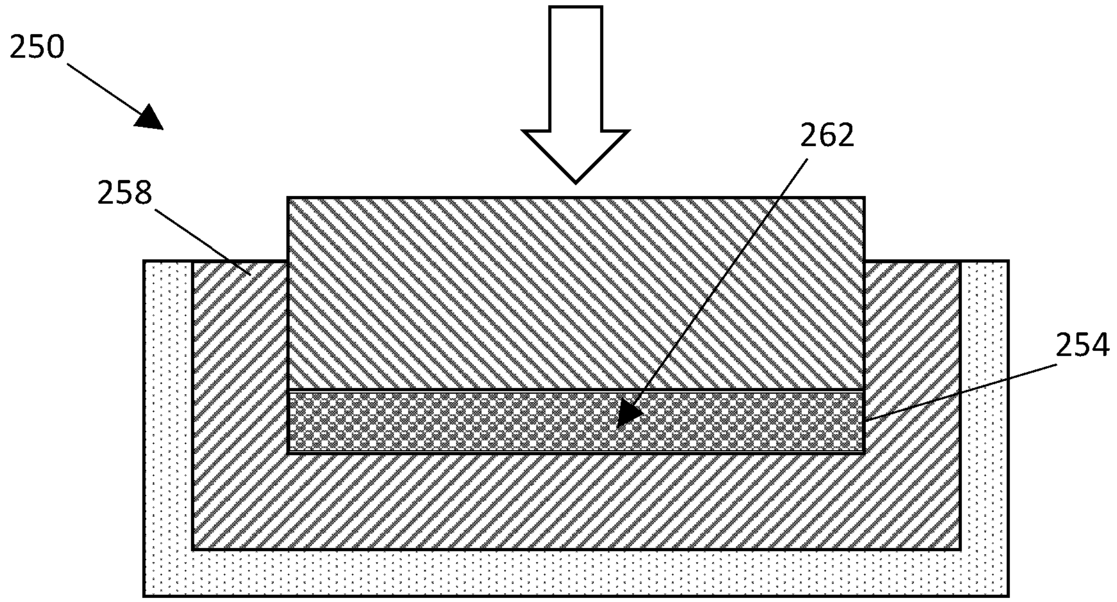
FIG. 6 is a schematic illustration of a compression mold for molding a part.

Molding Parts from Semi-Crystalline Polymer-Ceramic Core-Shell Particle Powders Referring now to FIGS. 5 and 6, FIG. 5 depicts a flowchart 200 of one example of a method of molding a part from a powder of the present core-shell particles, and FIG. 6 depicts a schematic illustration 250 of a compression mold for molding a part.

At a step 204, a working portion of a cavity 254 of a mold 258 is filled with a powder 262 of the present core-shell particles (e.g., 10).

At a step 208, the powder (262) is heated to at or above a first temperature (e.g., via a heating jacket 266) that exceeds (e.g., by at least 10° C., at least 20° C., at least 30° C., or more) a melting temperature ($T_m$) of the polymer. For example, when the $T_m$ of a particular polymer is ~275° C., the first temperature can be 280° C. or 300° C.

At a step 212, which may be partially or entirely simultaneous with step 208, the powder is subjected to a first pressure (e.g., 350 Megapascals (A/Pa)) in the mold while the powder (e.g, and the mold) is held at or above the first temperature. The pressure may be maintained for a period of minutes (e.g., equal to or greater than 5 minutes, 10 minutes, 20 minutes, 30 minutes, 40 minutes, 50 minutes, 60 minutes, or more). In some implementations, the conditions (temperature, pressure, and/the like) and period of time for which the conditions are maintained are sufficient to result in a molded part with a relative density of greater than 90%.

EXAMPLES

1. Example 1: Powder of PPS-$Al_2O_3$Core-Shell Particles

Materials: 11.67 grams (g) Alumina ($Al_2O_3$), 2.66 g PPS, 180 g NMP (split into 140 g and 40 g portions). Relative amounts of Alumina and PPS resulted in Alumina being about 60% by volume of the formed core-shell particles.

Procedure: The Alumina was homogenized in the 140 g portion of the NMP in a 600 mL beaker using an IKA homogenizer (available from IKA Works, Inc. (Wilmington, N.C. USA)) for 5 minutes at 15,000 revolutions per minute (rpm). A small amount of the 40 g portion of the NMP was then used to rinse the homogenizer head to remove residual Alumina from the homogenizer head. The Alumina and NMP mixture, and the PPS, were then added to a 600 mL PARR™ reactor shell/container with agitator. Some of the remainder of the 40 g portion of the NMP was used to rinse the beaker, with all of the NMP then being added to the PARR™ reactor shell. The PARR™ reactor shell was then attached to the PARR™ reactor unit and the reactor controller was powered on. A line from a nitrogen ($N_2$) source was then attached to the head-space port of the PARR™ reactor shell, and the headspace in the shell purged several times with $N_2$. During the purging process, the pressure in the reactor shell was observed to ensure a tight seal. In particular, it was known that the $N_2$ in a sealed reactor shell would typically reach 80-95 psi. As such, once the $N_2$ was added to the headspace, the $N_2$ source was turned off and all of valves on the PARR™ reactor were closed. When the pressure remained substantially constant after about 45 seconds (s), the pressure was released and the headspace purged with $N_2$ two or three total times. If instead the pressure decreased, the pressure was released, the unit tightened again, and the process repeated until the pressure remained constant and the headspace could be thereafter purged the two or three total times. After the headspace was purged, the thermocouple was inserted into the temperature port on the reactor shell, and the cooling water line for the agitator was opened or turned on. The locking ring was then added around the point at which the shell attached to the rest of the PARR™ reactor unit and tightened as much as possible by hand. The heater was then aligned with and secured around the reactor shell.

Figure 7A:
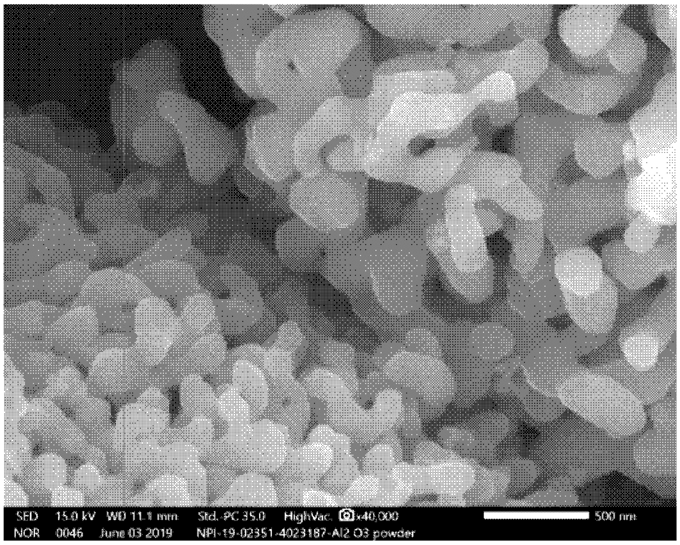
FIGS. 7A, 7B, and 7C respectively are scanning electron microscope (SEM) images of uncoated $Al_2O_3$ particles, PPS—$Al_2O_3$ core-shell particles, and a compression-molded composite parts made from a powder of the PPS-$Al_2O_3$ core-shell particles.
Figure 7B:
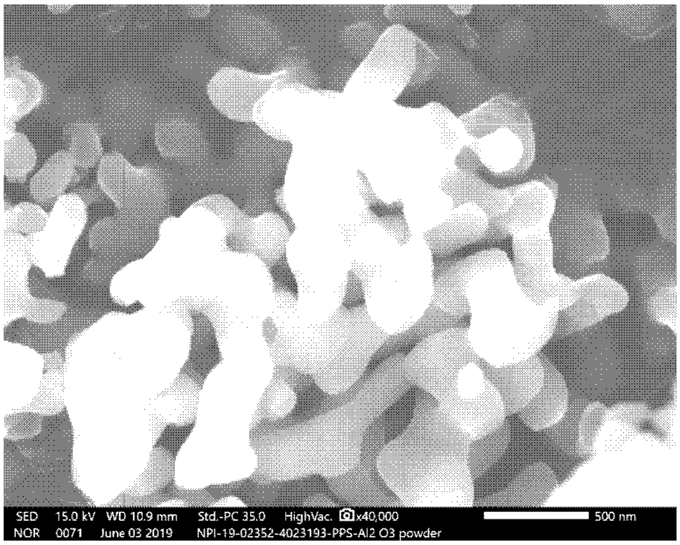

On the reactor controller, the primary temperature was then set to 270° C., the high limit pressure was set to 180 psi, the high limit temperature was set to 300° C. The heater was then set to Setting II (highest heat setting) and the agitator/impellor turned on and set to ~250 rpm. Once the temperature reached ~240° C., the heater was turned down to Setting I to allow for the maintenance of a more consistent temperature at 270° C. (to avoid the temperature fluctuating higher or lower than 270° C.). Once the thermocouple indicated the mixture in the reactor shell had reached 270° C., the reactor was held at that temperature for 30 minutes (min) while agitation continued. Reaction pressure at this temperature was about 75 psi or less, but in other implementations could be managed to be as high as 100 psi. After 30 minutes, the heater was turned off and the mixture allowed to cool to a temperature of 100° C. to ensure that all PPS had precipitated. Once the temperature reached 100° C., the pressure was typically at about 5 psi. The pressure release valve was then slowly turned to lower the pressure to ~0 psi. Once the pressure was relieved, the agitator was turned off, the reactor controller was turned off, and the cooling water line was turned off. The heater was then removed and the shell disengaged from the rest of the PARR™ reactor unit. The mixture in the reactor shell was then poured into a small beaker, and about an additional 100 milliliters (mL) of NMP was used to rinse residual material from the interior of the reactor shell for transfer to the beaker. The material in the beaker was then poured into a Buchner funnel and filter flask setup with a Whatman GF/F glass microfibre filter paper. The filtered wet cake was then rinsed with about 250 mL of Methanol (MeOH), and placed into an aluminum pan and dried under vacuum at 200° C. overnight. FIG. 7A depicts Alumina particles, and FIG. 7B depicts the PPS-Alumina core-shell particles. Certain properties of the resulting dry powder of PPS-$Al_2O_3$ core-shell particles were then measured and are included in Table 1 below.

2. Example 2: Compression Molded Pellet of PPS-$Al_2O_3$Core-Shell Particles

Materials: 2.0 g of a dry powder of PPS-$Al_2O_3$ core-shell particles as produced in Example 1 described above.

Figure 7C:
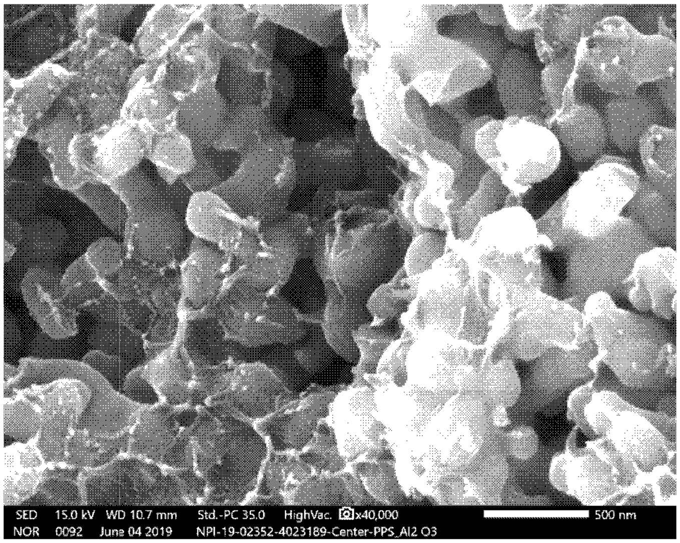

Procedure: 2.0 g of the powder was measured into an aluminum pan. Using a paper funnel, the powder was then poured into a circular cylindrical die of 13 millimeter (mm) internal diameter. The powder was then lightly compacted in the die using a rod, and a heating jacket was mounted around the die. The die was then heated to a first temperature of either 280° C. or 300° C., and maintained at the first temperature for five (5) minutes. A hydraulic press was then used to apply to the powder a pressure of 5 tons or 370 MPa The mold was then held at the first temperature, with the powder under pressure, for a period of thirty (30) minutes, after which the heater was turned off and the die allowed to cool while the pressure was maintained. After 30 minutes, the PPS-Alumina composite pellet was removed from the die, and the pellet weighed and its dimensions measured to calculate relative density. FIG. 7C depicts the microstructure of the compressed pellet, and certain characteristics of the pellets are included in Table 3 below.

3. Example 3: Powder of PEEK-$Al_2O_3$Core-Shell Particles (NMP Solvent)

Materials: 8.08 grams (g) Alumina ($Al_2O_3$), 1.92 g PEEK, 180 g NMP (split into 140 g and 40 g portions). Relative amounts of Alumina and PEEK resulted in Alumina being about 60% by volume of the formed core-shell particles.

Figure 8A:
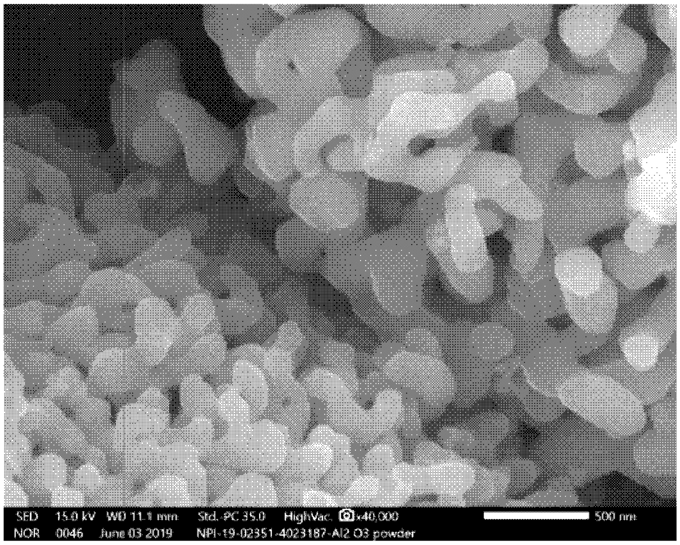
FIGS. 8A and 8B respectively are scanning electron microscope (SEM) images of uncoated $Al_2O_3$ particles, and PEEK-$Al_2O_3$ core-shell particles formed using NMP solvent.
Figure 8B:
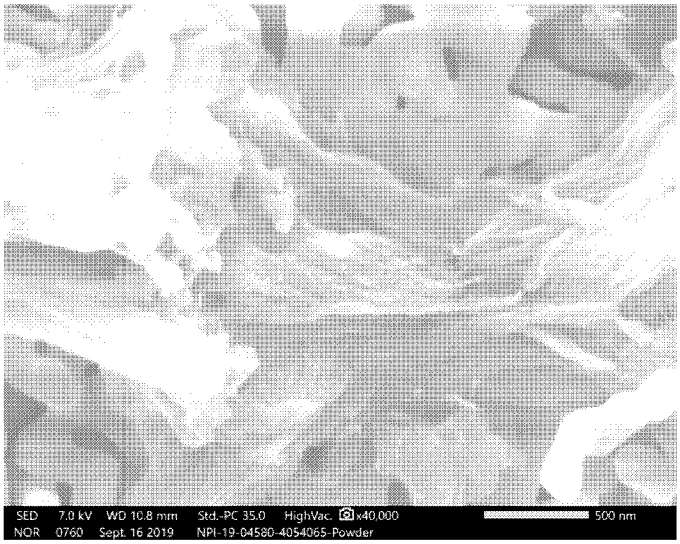

Procedure: The procedure for this Example 3 was substantially the same as that described above for Example 1, with the exceptions that PEEK was used in place of PPS, the Alumina was not homogenized prior to being mixed with the polymer in the PARR™ reactor shell, the primary temperature was set to 280° C. instead of 270° C., the agitator/impellor was set to 50 rpm instead of ~250 rpm, the reactor was held at temperature for 15 minutes instead of 30 minutes, the mixture was allowed to cool to 23° C. to ensure full precipitation instead of 100° C., and the core-shell particles were dried at 210° C. instead of 200° C. FIG. 8A depicts Alumina particles, and FIG. 8B depicts the PEEK-Alumina core-shell particles formed using NMP solvent. Certain properties of the resulting dry powder of PEEK-$Al_2O_3$ core-shell particles were then measured and are included in Table 1 below.

4. Example 4: Powder of PEEK-$Al_2O_3$Core-Shell Particles (ODCB Solvent)

Materials: 8.08 grams (g) Alumina ($Al_2O_3$), 1.92 g PEEK, 180 g ODCB (split into 140 g and 40 g portions). Relative amounts of Alumina and PEEK resulted in Alumina being about 60% by volume of the formed core-shell particles.

Figure 9A:
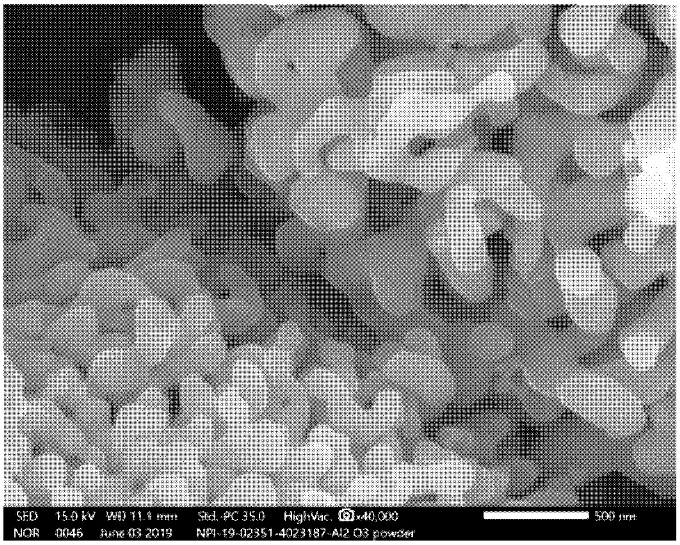
FIGS. 9A and 9B respectively are scanning electron microscope (SEM) images of uncoated $Al_2O_3$ particles, and PEEK-$Al_2O_3$ core-shell particles formed using ODCB solvent.
Figure 9B:
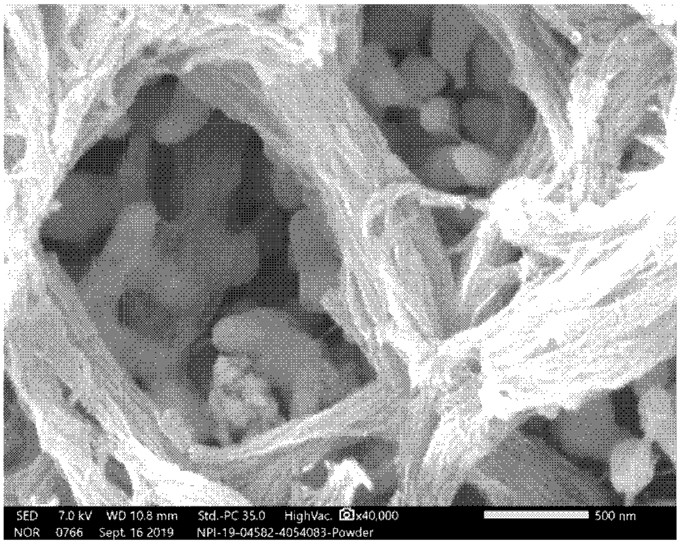

Procedure: The procedure for this Example 4 was substantially the same as that described above for Example 3, with the exception that ODCB solvent was used instead of NMP solvent. FIG. 9A depicts Alumina particles, and FIG. 9B depicts the PEEK-Alumina core-shell particles formed using NMP solvent. Certain properties of the resulting dry powder of PEEK-$Al_2O_3$ core-shell particles were then measured and are included in Table 1 below.

5. Example 5: Powder of PEEK-$Al_2O_3$Core-Shell Particles (ODCB Solvent)

Materials: 24.24 grams (g) Alumina ($Al_2O_3$), 5.76 g PEEK, 270 g ODCB (split into 210 g and 60 g portions). Relative amounts of Alumina and PEEK resulted in Alumina being about 60% by volume of the formed core-shell particles. The PEEK was VICTREX® PEEK150G from Victrex plc, and the Alumina was MARTOXID® RN-405 from HUBER Engineered Materials.

Figure 10A:
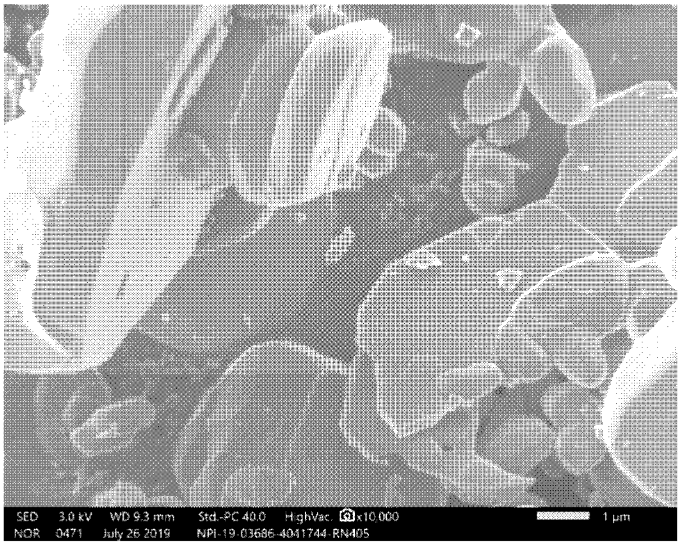
FIGS. 10A, 10B, and 10C respectively are scanning electron microscope (SEM) images of uncoated $Al_2O_3$ particles, of PEEK-$Al_2O_3$ core-shell particles formed using ODCB solvent, and a compression-molded composite part made from a powder of the PEEK-$Al_2O_3$ core-shell particles.
Figure 10B:
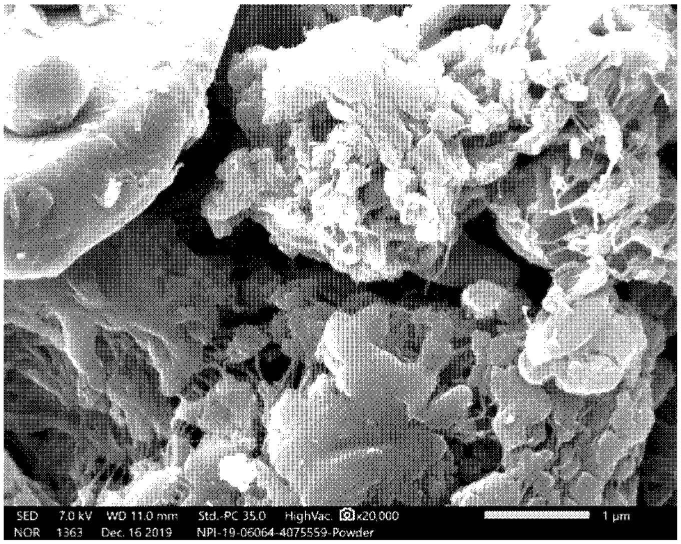

Procedure: The procedure for this Example 5 was substantially the same as that described above for Example 1, with the exceptions that PEEK was used in place of PPS, the primary temperature was set to 280° C. instead of 270° C., the mixture was allowed to cool to 23° C. to ensure full precipitation instead of 100° C., and the core-shell particles were dried at 210° C. instead of 200° C. FIG. 10A depicts the Alumina particles, and FIG. 10B depicts the PEEK- Alumina core-shell particles formed using ODCB solvent. Certain properties of the resulting dry powder of PEEK-$Al_2O_3$ core-shell particles were then measured and are included in Tables 1 and 2 below.

6. Example 6: Compression Molded Pellet of PEEK-$Al_2O_3$Core-Shell Particles

Materials: 1.2 g of a dry powder of PEEK-$Al_2O_3$ core-shell particles as produced using ODCB solvent in Example 5 described above.

Figure 10C:
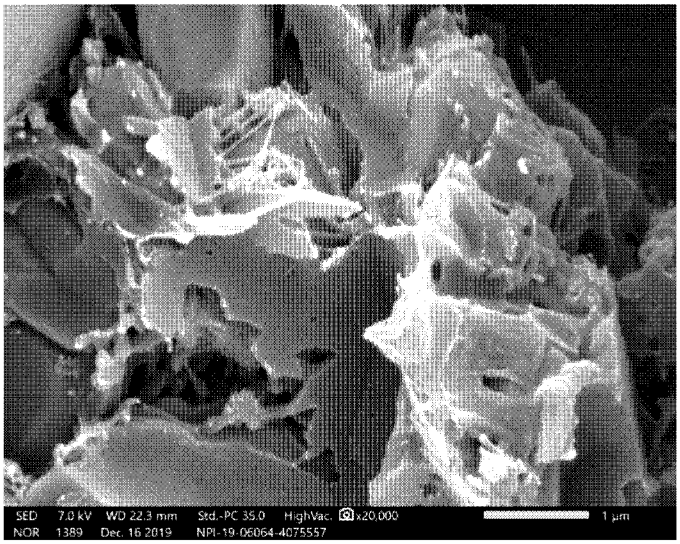

Procedure: The procedure for this Example 6 was substantially the same as that described above for Example 2, with the exception that the PEEK-$Al_2O_3$(ODCB) core-shell particles were used instead of PPS-$Al_2O_3$ core-shell particles. FIG. 10C depicts the microstructure of the compressed pellet, and certain characteristics of the pellets are included in Table 3 below.

7. Prophetic Example 7: Compression Molded Pellet of PEEK-$Al_2O_3$Core-Shell Particles Materials: 1.2 g of a dry powder of PEEK-$Al_2O_3$ core-shell particles as produced using NMP solvent in Example 3 described above, except with the Alumina homogenized as described in Example 1 prior to being mixed with the polymer in the PARR™ reactor shell.

Procedure: The procedure for this Prophetic Example 7 will be substantially the same as that described above for Example 6, with the exception that PEEK-$Al_2O_3$(NMP) core-shell particles will be used instead of PEEK-$Al_2O_3$ (ODCB) core-shell particles. The compression molded pellet is expected to exhibit a relative density greater than 80% and/or greater than 90%.

Procedure: The procedure for this Example 8 was substantially the same as that described above for Example 2, with the exceptions that a 35 mm die was used instead of a 13 mm die, PEEK-Alumina core-shell particles were used instead of PPS-Alumina core-shell particles, and the die was heated to a first temperature of 320° C. instead of 280° C. or 300° C. Certain properties of the resulting PEEK-Alumina pellet were then measured and are included in Table 4 below.

9. Experimental Results

As explained above for Examples 1-4, various combinations of powders with core-shell particles were produced, and certain processing parameters and properties of the powders are summarized in Table 1. As explained above for Examples 1-2, the superheat-cool powder-production process was carried out in a PARR' reactor with reaction pressures less than or equal to 75 psi. With the exception of a PPS reference powder, volume percent of ceramic or inorganic particles were set at 60% for comparison purpose. The PPS reference powder, designated in Table 1 as "Example 0" was made via a process similar to that described above for Example 1, with the exception that ceramic particles were not included in the mixture, PPS particles were included at 10% by volume of the NMP solvent, and agitation proceeded at ~125 rpm instead of ~250 rpm.

TABLE 1A

Powder Production via Superheat-Cool Process-Process Parameters

| Example | Polymer | Filler | Solvent | PARR Agitation (rpm) | Max Temp. C. | Holding Time, min | Mass Polymer (g) | Mass Ceramic (g) | Polymer/ceramic vol/vol |
|---|---|---|---|---|---|---|---|---|---|
| 0 | PPS | N/A | NMP | 125 | 270 C. | 30 | 10% solids | N/A | N/A |
| 1 | PPS | Alumina | NMP | 250 | 270 C. | 30 | 2.66 | 11.67 | 40/60 |
| 3 | PEEK | Alumina | NMP | 50 | 280 C. | 15 | 1.92 | 8.08 | 40/60 |
| 4 | PEEK | Alumina | ODCB | 50 | 280 C. | 15 | 1.92 | 8.08 | 40/60 |
| 5 | PEEK | Alumina | ODCB | 250 | 280 C. | 30 | 5.76 | 24.24 | 40/60 |

TABLE 1B

Powder Production via Superheat-Cool Process-Powder Parameters

| Example | Polymer | Filler | Dv10 (μm) | Dv50 (μm) | Dv90 (μm) | Tg (° C.) | Tm (° C.) | Exotherm (J/g) |
|---|---|---|---|---|---|---|---|---|
| 0 | PPS | N/A | 11.9 | 44.6 | 89.8 | N/A | 284.7 | 61.0 |
| 1 | PPS | Alumina | 0.031 | 0.3 | 28.5 | N/A | 279.7 | 11.2 |
| 3 | PEEK | Alumina | | | | N/A | 338.4 | 9.7 |
| 4 | PEEK | Alumina | | | | N/A | 338.2 | 10.5 |
| 5 | PEEK | Alumina | 10.4 | 13.3 | 23.9 | N/A | 339.5 | 14.5 |

8. Example 8: Compression Molded Plaque of PEEK-$Al_2O_3$Core-Shell Particles

Materials: 8.65 g of a dry powder of PEEK-$Al_2O_3$ core-shell particles as produced in Example 5 described above.

Particle size values of the powders were measured with a commercial particle size analyzer (available from Malvern Panalytical Ltd. in Malvern, UK).

Morphology of the particles was also investigated using scanning electron microscopy. In particular, FIG. 7A shows uncoated Alumina particles; FIG. 7B shows PPS-coated Alumina particles; and FIG. 7C shows PPA-Alumina core-shell particles compression molded into a part. PPS coating on the ceramic particles is evident on the core-shell powders in FIG. 7B. A thin layer of PPS is also evident between the ceramic grains in FIG. 7C.

Thermogravimetric analysis (TGA) properties for the core-shell powder of Example 5, describe above, are summarized in Table 2. The density of the powder is given as comparative reference. No apparent degradation in molecular weight of the polymer was observed as a result of the present superheating-cooling methods of making the present core-shell particles.

TABLE 2

Density, TGA, and Molecular Weight Data for Core-Shell Powders

| Example | Sample Type | Composition Filler | Polymer | Density (g/cc) | TGA Polymer (wt %) |
|---|---|---|---|---|---|
| 5 | Powder | $Al_2O_3$ | PEEK | 2.83 | 19.38 |

TGA results on a compression molded part made from the core-shell powders are summarized in Table 3. The density of the polymers parts molded at the same conditions as in Table 2 are given as comparative reference. No apparent degradation in molecular weight of the polymer was observed.

TABLE 3

Density and TGA of Pellets of Core-Shell Powders

| Example | Composition Filler | Polymer | Temp/ Time/Pres (° C.)/min/ ton | Density (g/cc) | Relative Density (%) | TGA Polymer (wt %) |
|---|---|---|---|---|---|---|
| 2 | $Al_2O_3$ | PPS | 280/30/5 | 2.75 | 97.6 | 21.52 |
| 6 | $Al_2O_3$ | PEEK | 320/30/5 | 2.81 | 93.7 | 19.87 |

Relative Density was determined by measuring the density of the molded pellet (Measured Density ($\mu_M$)) and comparing that to the Theoretical Density. The Measured Density may be calculated by dividing the volume, determined by measuring the outer dimensions (the volume of other shapes can be determined by any of various known methods, for example by submersion in an incompressible fluid), by the weighing the pellet (determined with a scale or balance). For the present examples, the Measured Density of the samples (e.g., pellets) was determined by the Archimedes method, using a KERN ABS-N/ABJ-NM balance equipped with an ACS-A03 density determination set. In particular, each sample was dried and the dry weight ($W_{dry}$) measured. The sample was then subjected to boiling in water for a period of 1 h to ensure that all voids in the object were filled with the water. The sample when then suspended in the used liquid at a known (non-boiling) temperature to determine the apparent mass in liquid ($W_{sus}$). The sample was then removed from the water, and the excess water wiped from the surface of the sample using a tissue moistened with the water. The saturated sample was then immediately weighed in air ($W_{sat}$). The density was then determined using Formula (6):

$$\text{Density part} = \frac{Wdry}{Wsat - Wsus} * \text{density of water} \quad (6)$$

In the present examples, the quantities of polymer and ceramic in a pellet were known. When the starting proportions are not known, the organic content of the polymer in the compression-molded pellet can be determined by thermogravimetric analysis (TGA) in air, permitting the calculation of the content of ceramic in the compression-molded pellet. The combined density or Theoretical Density ($\rho_T$), assuming zero voids/gas content, was then calculated using Formula (7):

$$\rho_T = ((m_p \times \rho_p) + (m_c \times \rho_c))/(m_p + m_c) \quad (7)$$

where $m_p$ is the mass of the polymer in the molded pellet, $\rho_p$ is the density of the polymer, $m_c$ is the mass of the ceramic in the molded pellet, and $\rho_c$ is the density of the ceramic. Relative Density ($\rho_R$) is then calculated according to Formula (8):

$$\rho_R = \rho_M/\rho_T \times 100 \quad (8)$$

The measurement of weight changes, programmed as isothermal or linear heating temperature conditions, can be monitored in solid or liquid specimen by the use of a Thermogravimetric Analyzer (TGA). The measurement of weight change, normally weight loss, can result from the degradation (thermal or oxidative) of the specimen, of by the evolution of volatiles below the degradation temperature of the sample. For the TGA measurements discussed herein, less than 50 mg of sample was weighed in a platinum pan, and the TGA test was conducted using a Discovery TGA at hearing rate of 20° C. per minute in air.

Thermal analysis (Tg and Tm) was performed by differential scanning calorimetry (DSC), a method of measuring heat flow as a function of temperature, as well as thermal transitions of samples (e.g., polymers, monomers, and additives) according to a predetermined time and temperature program. These thermal transitions are measured during heating, cooling, or isothermal cycles; and these transitions occur when the material undergoes a physical or chemical change. DSC was carried out on a TA-Q1000 Analyzer at 20 C/min.

Rectangular beams were also cut using a CNC mill from the 35 mm diameter pellet produced above for Example 8, and certain mechanical properties determined. In particular, beams were cut to have a rectangular cross section of 4 mm×3 mm, and were polished using a 600 grit sand paper and tested under 3-point bending at a 1 mm per minute (mm/min) displacement rate. Table 4 summarizes the measured properties along with reference properties of $Al_2O_3$ alone obtained in literature.

TABLE 4

| Mechanical Properties of Compression Molded Parts | | | |
|---|---|---|---|
| | Mechanical Properties | | |
| Example | Flexural Modulus (GPa) | Flexural Strength (MPa) | Flexural Strain (%) |
| 8 | 21.2 | 102.4 | 1.072 |
| $Al_2O_3$ | 350-400 | ~350 | |

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this disclosure. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiments. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments. Accordingly, no single implementation described herein should be construed as limiting and implementations of the disclosure may be suitably combined without departing from the teachings of the disclosure.

The claims are not intended to include, and should not be interpreted to include, means plus- or step-plus-function limitations, unless such a limitation is explicitly recited in a given claim using the phrase(s) "means for" or "step for," respectively.

The invention claimed is:

1. A method of forming a ceramic-polymer composite powder, the method comprising:

mixing a solvent, particles of a ceramic that is selected from the group of ceramics consisting of: $Al_2O_3$, $ZrO_2$, and combinations of $Al_2O_3$ and $ZrO_2$, and a semi-crystalline polymer selected from the group of semi-crystalline polymers consisting of: polyphenylene sulfide (PPS), polyaryl ether ketone (PAEK), polybutylene terephthalate (PBT), polypropylene (PP), polyethylene (PE), semi-crystalline polyimide (SC PI), and semi-crystalline polyamide (SC Polyamide), to create a mixture;

dissolving at least partially the semi-crystalline polymer in the solvent by superheating the mixture to a first temperature above the normal boiling point of the solvent and while maintaining the mixture at or above a first pressure at which the solvent remains substantially liquid;

agitating the mixture for a period of minutes while maintaining the mixture in a superheated state at or above the first temperature and at or above the first pressure;

cooling the mixture to or below a second temperature below the normal boiling point of the solvent to cause the semi-crystalline polymer to precipitate on the particles of the ceramic and thereby form a plurality of core-shell particles each comprising a core and a shell around the core, where the core comprises a particle of the ceramic and the shell comprises the semi-crystalline polymer.

2. The method of claim 1, where the mixing step comprises:

mixing the solvent and the particles of the ceramic;

agitating the mixture of the solvent and the particles of the ceramic to de-agglomerate the particles of the ceramic;

mixing the semi-crystalline polymer into the agitated mixture of the solvent and the particles of the ceramic.

3. The method of claim 1, further comprising one or more steps selected from the group of steps consisting of:

agitating the mixture during the cooling step;

washing the core-shell particles after the cooling step; and drying the core-shell particles at a temperature above the normal boiling point of the solvent, optionally at a second pressure below ambient pressure.

4. The method of claim 1, where the solvent comprises N-Methyl-2-pyrrolidone (NMP).

5. The method of claim 2, where the solvent comprises N-Methyl-2-pyrrolidone (NMP).

6. The method of claim 3, where the solvent comprises N-Methyl-2-pyrrolidone (NMP).

* * * * *